US006839978B2

(12) United States Patent
Allen

(10) Patent No.: US 6,839,978 B2
(45) Date of Patent: Jan. 11, 2005

(54) PRECISE ADJUSTMENT INDICATOR HOLDER AND METHOD

(76) Inventor: Joseph Allen, 2658 N. Delco, El Monte, CA (US) 91733

( * ) Notice: Subject to any disclaimer, the term of this patent is extended or adjusted under 35 U.S.C. 154(b) by 0 days.

(21) Appl. No.: 10/705,114

(22) Filed: Nov. 10, 2003

(65) Prior Publication Data

US 2004/0134086 A1 Jul. 15, 2004

Related U.S. Application Data

(60) Provisional application No. 60/425,067, filed on Nov. 8, 2002.

(51) Int. Cl.[7] .............................................. B27G 23/00
(52) U.S. Cl. .......................................... 33/642; 33/626
(58) Field of Search ........................ 33/568, 572, 573, 33/626, 638, 642, 645, 792, 805

(56) References Cited

U.S. PATENT DOCUMENTS

| | | | |
|---|---|---|---|
| 2,371,451 A | | 3/1945 | Larson |
| 3,432,932 A | * | 3/1969 | Hurick et al. .................. 33/642 |
| 3,442,478 A | | 5/1969 | Parapetti |
| 3,785,058 A | * | 1/1974 | Egli ............................. 33/642 |
| 3,826,011 A | * | 7/1974 | D'Aniello ..................... 33/642 |
| 3,858,836 A | | 1/1975 | Marcyan |
| 4,208,157 A | | 6/1980 | Guarino |
| 4,750,699 A | | 6/1988 | Tingley |
| 4,930,954 A | | 6/1990 | Dague |
| 4,986,003 A | * | 1/1991 | DoCarmo ..................... 33/645 |
| 5,036,595 A | | 8/1991 | Nevery |
| 5,097,603 A | | 3/1992 | Hirsch |
| 5,456,017 A | | 10/1995 | Meier |
| 5,539,988 A | * | 7/1996 | Braun .......................... 33/572 |
| 5,704,132 A | * | 1/1998 | Bourne ......................... 33/626 |
| 5,987,767 A | * | 11/1999 | Roddie ......................... 33/645 |
| 6,032,381 A | | 3/2000 | Miller |
| 6,298,567 B1 | | 10/2001 | Coderre |

* cited by examiner

*Primary Examiner*—G. Bradley Bennett
(74) *Attorney, Agent, or Firm*—Robert J. Schaap

(57) ABSTRACT

A precise adjustment indicator holder in which a position indicator is carried with respect to a work tool and a work piece. The indicator holder connects to the quill of the work tool, such as a machine tool, or other supporting device and is comprised of a pair of arms which are pivotally connected to one another and movable in planes parallel to and relative to one another. The arms are provided with abutments to limit the degree of movement such that precise final adjustment of the positioning of the work tool can be achieved.

15 Claims, 4 Drawing Sheets

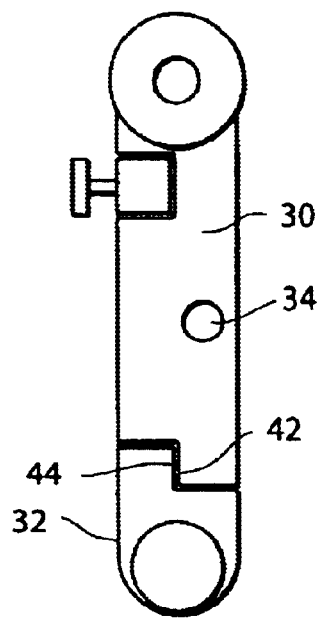
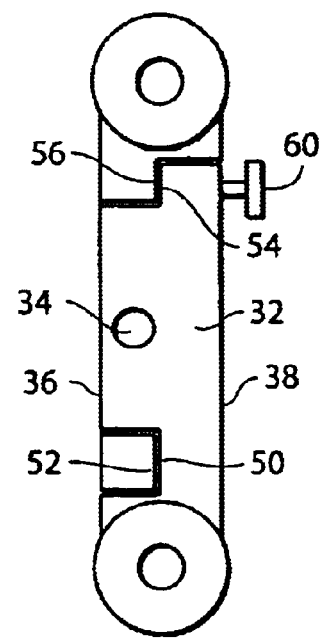
FIG. 3          FIG. 4
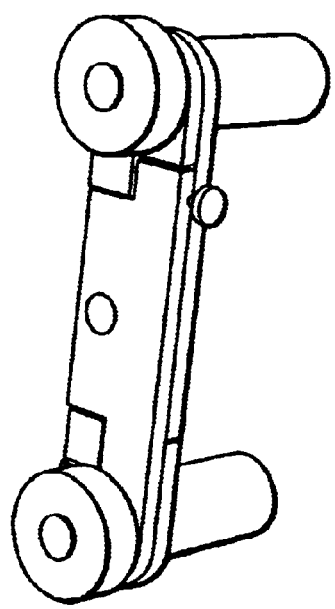
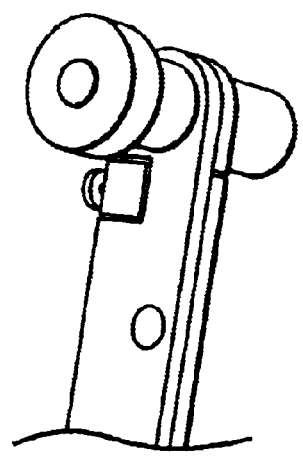
FIG. 5          FIG. 6

PRECISE ADJUSTMENT INDICATOR HOLDER AND METHOD

RELATED APPLICATIONS

This application is based on and claims priority from my U.S. Provisional Patent application Ser. No. 60/425,067 filed Nov. 8, 2002 for Precise Adjustment Indicator Holder.

BACKGROUND OF THE INVENTION

1. Field of the Invention

This invention relates to precise adjustment indicator holders and, more particularly, to precise adjustment indicator holders which use a. pair of generally parallel facewise opposed arms capable of being pivotally movable relative to one another to achieve a precise adjustment of a work piece relative to a work tool.

2. Brief Description of Related Art

It is common in the machine tool industry to use a precise adjustment indicator holder in order to position a work piece relative to a work tool such as, for example, a rotating bit of a milling machine, or the like. Usually, a rough adjustment is initially made, frequently by sight, to position a work tool relative to a work piece.

In particular, in tramming operations, that is where a work piece, such as a sheet of metal, is being cut or milled by an active cutting member, precise adjustment of the work piece is frequently required. This is particularly true where the work piece results in a product designed for close tolerance operation. In the case of milling operations, criticality of position may be required to a very fine tolerance, e.g. $\frac{1}{10,000}$ of an inch, or more. Therefore, it is quite important to ensure that the work piece is properly positioned prior to commencement of a cutting operation.

In many machining operations and other machine forming operations and, particularly, in milling operations, even a slight degree of error in the actual machine cutting operation can result in a work piece which has an error in tolerance. In many cases, this error in tolerance can render the work piece to be virtually useless for its intended purpose. Consequently, precise adjustment of a work piece with respect to a cutting member or other work member can be of significant importance.

In most cases, the indicator involved and which is to be held for purposes of precise adjustment may be a dial test indicator, namely a gauge, which may show a positioning of a machine tool with respect to a work piece. The spindle or collet of the machine tool is frequently referred to as a quill, as aforesaid. The indicator holder typically employs a quill clamp, that is a C-clamp secured to the quill, generally perpendicular to the axis of the quill. In many cases, an articulated arm extends from that clamp to the work piece and carries the indicator thereon.

The indicator holder provides an advantage in set-up of the machine tool. In this way, machine tools, such as a milling bit or other tool, can be mounted on the spindle or collet of the tool and located at a precise distance with respect to the work piece. In this way, errors which might otherwise occur in the machining operation can be avoided.

These indicator holders are frequently referred to as "minindicol indicator holders" or, otherwise, as "indicol indicator holders". There are several disadvantages of the present commercially available indicator holders.

One of the primary disadvantages of prior art devices is the fact that almost all of such indicator holders are constructed with two or more articulated arms. In this case, each of the arms are connected to one another in somewhat of a cantilevered fashion. It may be appreciated that in the actual operation of the machine tool, even during tests or set-up procedures, vibrations will result. These vibrations can actually affect the positioning of the articulated arms, even to a slight degree and, hence, this can affect the positioning of the work tool relative to the work piece.

Even if the length of the adjustable arm in these commercially available indicator holders is not substantial, they are frequently designed so that they are not capable of use in close quarters. Unfortunately, the positioning of the indicator holder may be such that it is difficult to avoid interference with the machine tool and any surrounding immovable structure.

One of the currently available techniques used to avoid this problem is to provide several differently sized indicator holders. This, unfortunately, necessarily adds to the cost of the indicator holder system which is used and, hence, that cost is translated into the final cost of the work piece.

Even if the length of the articulated arms in the conventional minindicol indicator holder is not substantial, these indicator holders tend to twist, even to a slight degree. Again, this slight degree can result in a significant positioning error of the work tool with respect to the work piece. It may be appreciated that even a slight twisting action can result in the manufacture of a part which does not meet the required tolerances.

In short, there is no conventional indicator holder which overcomes these numerous disadvantages associates with each of the prior art indicator holders.

OBJECTS OF THE INVENTION

It is, therefore, one of the primary objects of the present invention to provide an indicator holder for holding an indicator member with respect to a work tool and which avoids the use of a large number of articulated arms.

It is another object of the present invention to provide an indicator holder of the type stated which does not suffer from slight vibrations which may be induced in a cutting operation or even in the operation of a machine tool and which thereby avoids inaccuracies which may be inherent in many prior art indicator holders.

It is a further object of the present invention to provide an indicator holder of the type stated which can be used for accurately positioning a machine tool with respect to a work piece in a tramming operation and allows for fine adjustment to achieve precision positioning of the work piece or of the work tool with respect to the work piece.

It is an additional object of the present invention to provide an indicator holder of the type stated which can be constructed in such manner that it is of relatively low cost construction and thereby provides a precision holder which can be obtained at a relatively low cost.

It is another salient object of the present invention to provide a method of positioning a work tool with respect to a work piece or, otherwise, positioning a work piece with respect to a work tool and which requires only minimal adjustment operations by an operator of the machine tool and which also only necessitates minimal attention by an operator of the machine tool.

With the above and other objects in view, my invention resides in the novel features of form, construction, arrangement and combination of parts and components presently described and pointed out in the claims.

SUMMARY OF THE INVENTION

An indicator holder which allows for precise adjustment of a machine tool with respect to a work piece or otherwise which allows adjustment of the positioning of the work piece with respect to the machine tool. In many cases, the machine tool itself is a milling machine designed for the cutting of conventional metals to produce a machine cut part or work piece.

The indicator holder of the invention utilizes, but does not necessarily include, a conventional clamping member, such as a C-clamp, for engaging and holding a measuring or indicator device. This measuring or indicator device also does not necessarily form part of the indicator holder of the invention and may be in the form of a conventional gauge or the like. The C-clamp which is used for holding the indicator is connected to the actual indicator holder of the invention.

The indicator holder of the present invention comprises a pair of arms which are adapted to lie against one another in a facewise engagement. Moreover, each of these arms which lie in facewise engagement are generally parallel to one another and have the opposed faces thereof generally in sliding contact with one another. In addition, the pair of arms are connected usually by a single pivot, approximately midway between the ends of these arms so that one arm may be articulatable relative to the other of the arms and vice versa.

Each of the arms forming part of the indicator holder of the present invention are connected at their outer ends with adjustment mechanisms. These adjustment mechanisms may adopt, for example, the forms of rotatable knobs which can be released and locked to a further piece such as, for example, a further articulatable arm, if required. Otherwise, they may be designed for connection to any other structure. The rotatable knobs also serve as release knobs which are located on each of these adjustment mechanisms and, when rotated in one direction, will allow for positioning of the entire indicator holder and, when tightened, will lock the indicator holder in a precise position.

The pair of mating arms which lie in facewise engagement with one another are each constructed so that each is provided with a stop to limit movement of the opposite arm beyond a predetermined amount of movement. Thus, each of the arms can pivot relative to one another but only for a fairly limited distance. However, this distance is sufficient so that the precise adjustment can be obtained.

The stops which limit the amount of pivotal movement of one arm with respect to the other are integral with the arms in a preferred embodiment. Moreover, they fit within slots formed in the opposite arm for which they cause a limit of movement.

This invention possesses many other advantages and has other purposes which may be made more clearly apparent from a consideration of the forms in which it may be embodied. These forms are shown in the drawings forming a part of and accompanying the present specification. They will now be described in detail for purposes of illustrating the general principles of the invention. However, it is to be understood that the following detailed description and the accompanying drawings are not to be taken in a limiting sense.

BRIEF DESCRIPTION OF THE DRAWINGS

Figure 1:
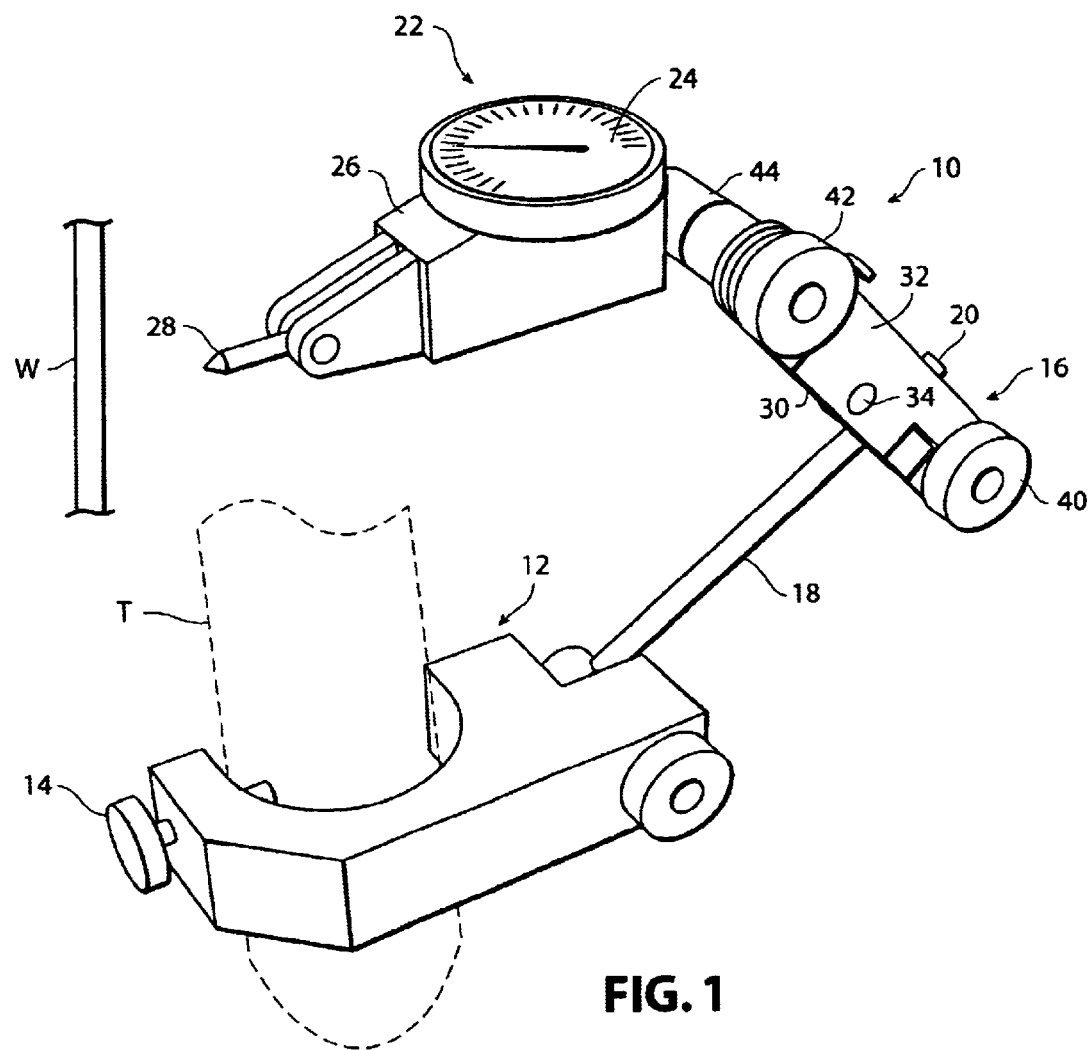
Figure 2:
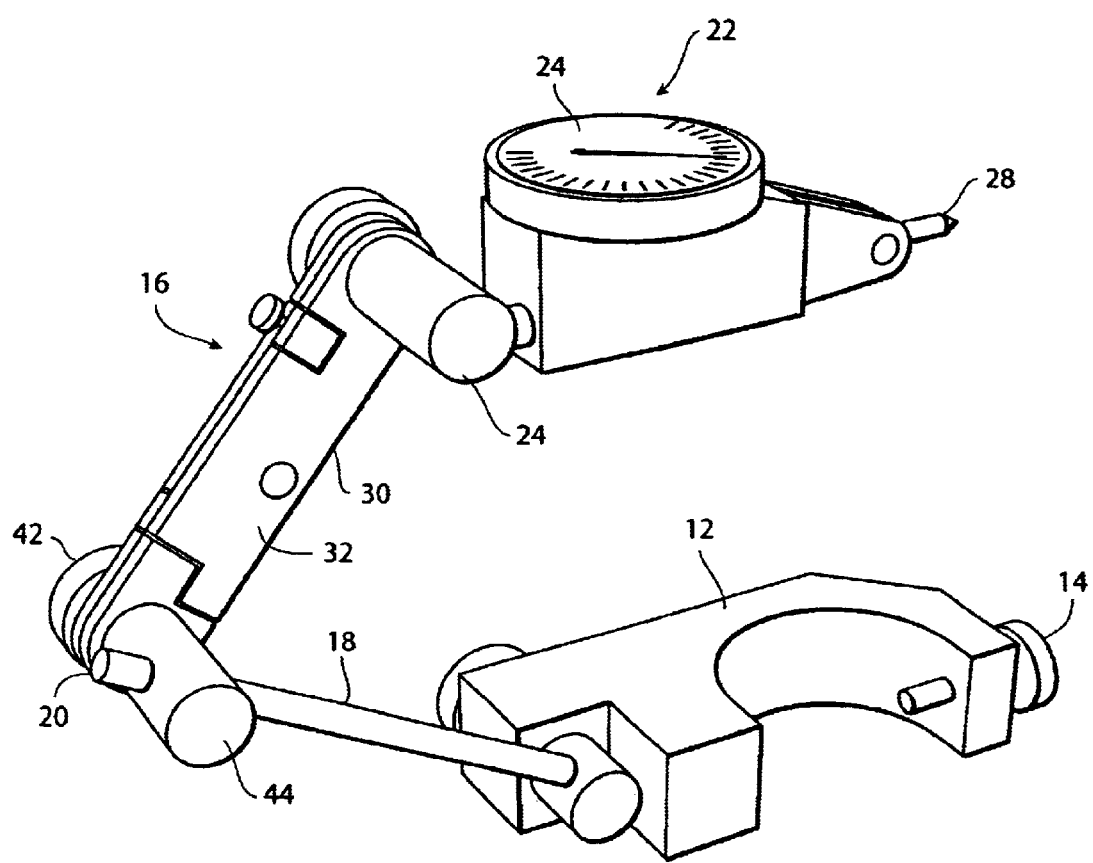
Figure 7:
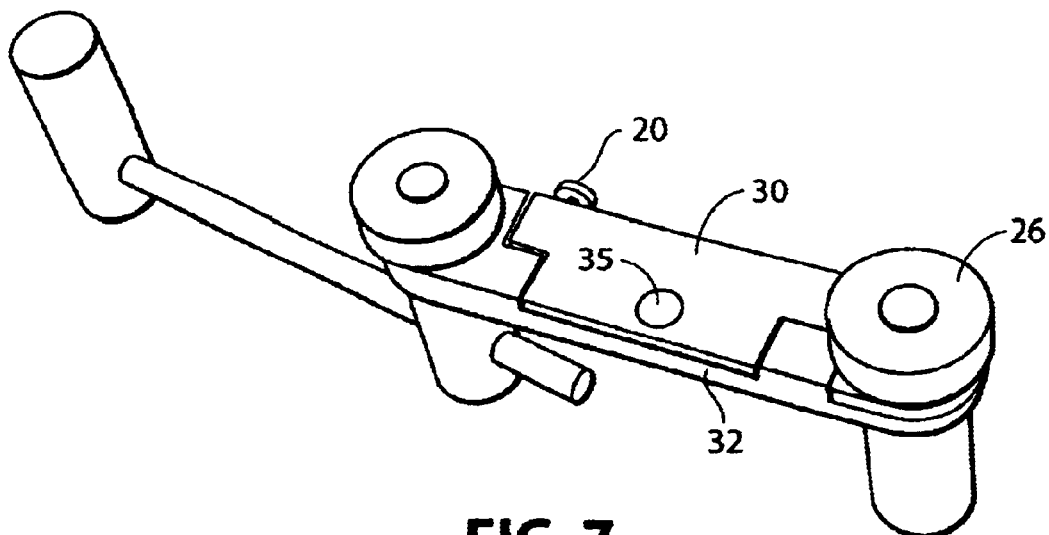
Figure 8:
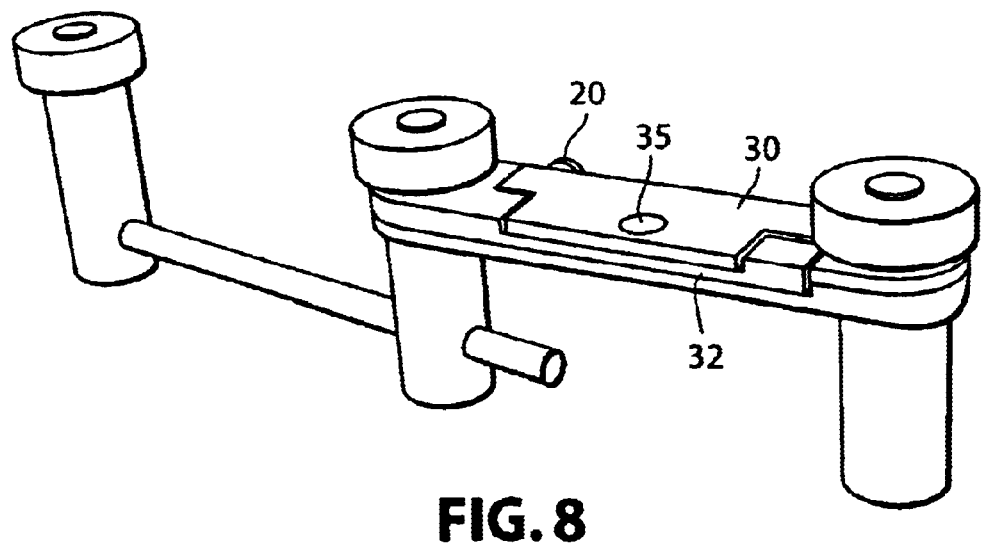

Having thus described the invention in general terms, reference will now be made to the accompanying drawings in which:

FIG. 1 is a perspective view of a precise adjustment indicator holder in connection with the present invention and shown in connection with an indicator and also with a C-clamp arranged with respect to a collet of a machine tool;

FIG. 2 is a perspective view of the indicator holder of the present invention;

FIG. 3 is a side elevational view taken substantially along the plane of the arrow designated "FIG. 3" in FIG. 2 of the drawings and sharing a two-arm precise adjustment mechanism;

FIG. 4 is a side elevational view of the opposite side of the two arm adjustment mechanism of FIG. 3;

FIG. 5 is a perspective view showing one end position of the adjustment mechanism of the invention;

FIG. 6 is a fragmentary perspective view of an opposite side of the indicator holder of the invention;

FIG. 7 is a perspective view showing positions of the two parallel arms of the adjustment mechanism in one position; and FIG. 8 is a perspective view of the opposite side of the pair of arms of the adjustment mechanism of the present invention.

DETAILED DESCRIPTION OF A PREFERRED EMBODIMENT

Referring now in more detail and by reference characters to the drawings, 10 designates an assembly for obtaining both coarse adjustment and, thereafter, fine adjustment of a work piece W with respect to a machine tool T. In this case, the work piece W and the machine tool T are illustrated only schematically. The work piece W may be any form of suitable work piece, such as a piece of metal which is being machined and the tool, in this case, illustrates the collet or spindle T of the work tool.

The adjustment assembly 10 comprises a clamp 12, such as a conventional C-clamp, and which is secured to the spindle T and positioned thereon by means of an adjustment bolt 14 forming part of the clamp 12. A fine adjustment indicator 16 is connected to the clamp 12 by means of a rod 18 and can be locked into the rod by means of a locking nut 20. The rod, in this case, may adopt any form of connector, such as a flat link or the like. However, its purpose is to primarily connect the fine adjustment mechanism 16 to an indicator 22. The indicator 22 is actually a dial or gauge 24 mountable on a block 26 and which has a sensor pin 28 at its forward end for engaging the work piece W in the manner as shown in FIG. 1. The fine adjustment indicator 16 is more fully illustrated in FIGS. 2–8 of the drawings.

The fine adjustment indicator 16 comprises a pair of plates, such as a plate 30 and a plate 32, and where the plate 32 is essentially a mirror image of the plate 30. Each of the two plates are pivotally connected to one another through a pivot pin 34 somewhat centrally between their ends and also somewhat centrally between vertical margins 36 and 38. One of the plates, such as the plate 32, is formed at its lower end with an opening to receive the link 18. The position of the link may also be adjustable through an adjustment knob 40.

At its upper ends, reference being made to FIG. 1, each of the plates are provided with an adjustment knob 42 mounted within a shaft 44 extending between each of the plates. The illustrations in FIGS. 2–4 are essentially reversed with respect to FIG. 2 and, hence, the adjustment knob 42 is located at the lower end thereof.

In any event, each of the two plates 30 and 32 can lie in marginal registration, as shown in FIGS. 3 and 4 of the drawings. Thus, the edges 36 and 38 are essentially co-planar with one another when the plates lie in marginal registration. However, one of the plates is pivotable about the pivot pin 34 to a limited degree on either side of the other.

One of the plates, such as the plate 32, for example, has a rectangular notch 50 at one end and receives a rectangular upstanding projection 52 on the other of the plates 30. The plate 32 also has a somewhat Z-shaped notch 54 in proximity to the end of that plate 32. This notch 54 matches the somewhat Z-shaped projection 56 in the opposite of the plates 30. The plates are constructed so that in the reverse appearance they would each have a similar construction. Thus, for example, the appearance of the plate 30 would be a mirror image of that of the plate 32 when viewed directly from above. One of the plates 32 is shiftable relative to the plate 30 by means of an adjustment knob 60. When the knob is tightened a threaded shank of that knob will bear against the notch 56 formed in the plate 30 and cause a biasing movement of the plate 32 about the pivot pin 34 and relative to the plate 30. Inasmuch as the pin projects into the plate 30, by rotating the knob 60 in the opposite direction, the plate 32 can be pivoted to the opposite direction relative to the plate 30.

Referring to FIGS. 7 and 8, it can be observed that when the knob 60 is rotated in one direction, the plate 32 will be shifted to the right relative to the plate 30. When the knob 60 is rotated in the opposite direction, the plate 32 will be shifted to the opposite side of the plate 30 in the manner as best shown in FIGS. 7 and 8 of the drawings.

It can be observed in connection with the adjustment mechanism 16 that shifting of one plate relative to the other will allow a shifting of the sensor 28 relative to the work piece W. This slight adjustment is all that is required to obtain a fine positioning of the work piece W with respect to the collet of the machine tool T. Moreover, the operator can monitor that positioning by examination of the gauge 24.

It can be observed that the step-shaped notch 56 and the cooperating step-shaped notch 54 provide an adjustment gap between the two legs. The rectangular notch 50 and the abutment 52 serve to provide as a degree of limit of the movement of the two plates 30 and 32 relative to one another. In this way, the leg segment 32 can pivot to a slight degree with respect to the plate 30 and, as indicated, this is all that may be necessary in order to obtain that fine accurate positioning.

Thus, there has been illustrated and described a unique and novel precise adjustment indicator holder and which thereby fulfills all of the objects and advantages which have been sought. It should be understood that many changes, modifications, variations and other uses and applications which will become apparent to those skilled in the art after considering the specification and the accompanying drawings. Therefore, any and all such changes, modifications, variations and other uses and applications which do not depart from the spirit and scope of the invention are deemed to be covered by the invention.

Having thus described the invention, what we desire to claim and secure by letters patent is:

1. A precise adjustment indicator holder to allow precise adjustment between a machine tool and a work piece, said precise adjustment indicator holder comprising:
    a) a pair of generally parallel arms with relatively flat faces on each of said arms opposed to one another and with each having first ends and second ends;
    b) pivot means connecting each of said arms so that one arm can rotate relative to the other of said arms about said pivot means to a limited degree;
    c) an indicator holder operatively connected to an end of at least one of said arms for indicating the relative position between the machine tool and the work piece; and
    d) adjustment means operatively connected to at least one of said arms for adjusting the position of one of said arms relative to the other of said arms to thereby obtain fine adjustment of the position between the machine tool and the work piece.

2. The precise adjustment indicator holder of claim 1 further characterized in that said indicator holder comprises:
    movement limiting means for limiting the degree of movement of one of the arms relative to the other.

3. The precise adjustment indicator holder of claim 1 further characterized in that said indicator holder comprises:
    movement limiting means for limiting the degree of movement of each of the arms relative to the other.

4. The precise adjustment indicator holder of claim 1 further characterized in that said first and second arms are capable of being in general marginal registration and shifted to either side thereof so that they are out of marginal registration.

5. The precise adjustment indicator holder of claim 2 further characterized in that said movement limiting means comprises:
    a) a notch in said first arm in proximity to a first end thereof and engaging a similar notch in proximity to a second end of said second arm, and which notches also engage one another to limit movement of said arms relative to one another in one direction; and
    b) a notch in the first end of said second arm in proximity to the second end of said first arm, and which notches also engage one another to limit movement of said arms relative to one another in the other direction.

6. The precise adjustment indicator holder of claim 5 further characterized in that said notch in proximity to said first end of said first arm is similar in shape to the notch in proximity to the first end of said second arm and that the notch in the second end of said first arm is similar in shape to the notch in the second end of the second arm.

7. The precise adjustment indicator holder of claim 6 further characterized in that the notches are formed in such manner that each provide an abutment shoulder on one arm which engages a facing abutment shoulder of the other of said arms.

8. The precise adjustment indicator holder of claim 1 further characterized in that said adjustment means comprises a pin which is located at one of said arms and is shiftable to an edge of the other of said arms to abut against the other of the arms and thereby cause a pivoting movement of the other of the arms.

9. Apparatus for obtaining coarse adjustment and thereafter obtaining fine adjustment between work piece and a machine tool, said apparatus comprising:
    a) an indicator assembly operable to provide a visual indication of the positioning of the work piece and the machine tool;
    b) coarse adjustment means operatively associated with said indicator assembly to provide a coarse adjustment of the position between the work piece and the machine tool; and
    c) fine adjustment means operatively connected to said coarse adjustment means comprising a pair of facewise opposed arms which are pivotally movable relative to one another to achieve a fine adjustment between the work piece and the machine tool.

10. The apparatus for obtaining coarse adjustment and fine adjustment of claim 9 further characterized in that said indicator holder comprises movement limiting means for limiting the degree of movement of one of the arms relative to the other.

11. The precise adjustment indicator holder of claim 9 further characterized in that said first and second arms are capable of being in general marginal registration and shifted to either side thereof so that they are out of marginal registration.

12. The apparatus for obtaining coarse adjustment and fine adjustment of claim 10 further characterized in that said movement limiting means comprises:

a) a notch in said first arm in proximity to a first end thereof and engaging a similar notch in proximity to a second end of said second arm, and which notches also engage one another to limit movement of said arms relative to one another in one direction; and b) a notch in the first end of said second arm in proximity to the second end of said first arm, and which notches also engage one another to limit movement of said arms relative to one another in the other direction.

13. The apparatus for obtaining coarse adjustment and fine adjustment of claim 12 further characterized in that said notch in proximity to said first end of said first arm is similar in shape to the notch in proximity to the first end of said second arm and that the notch in the second end of said first arm is similar in shape to the notch in the second end of the second arm.

14. A method for obtaining both coarse adjustment and, thereafter, obtaining fine adjustment of an indicator holder to allow precise adjustment between a machine tool and a work piece, said method comprising:

a) locating the clamping means with respect to a collet of machine tool and adjusting the mounting of that clamping means to obtain a coarse adjustment;

b) locating an indicator with respect to a collet of said machine tool with a fine adjustment means comprised of a pair of facewise opposed arms which are pivotally movable relative to one another;

c) pivotally shifting one of the arms in facewise engagement with the other of the arms relative to the second of the arms to obtain a fine adjustment of the indicator means to thereby obtain fine adjustment between the work piece and the machine tool.

15. The method for obtaining both coarse adjustment and, therefore, obtaining fine adjustment of an indicator holder of claim 14 further characterized in that one of the arms relative to the other of the arms to thereby obtain the fine adjustment.

* * * * *